United States Patent [19]
Tsukihashi et al.

[11] Patent Number: 5,841,742
[45] Date of Patent: Nov. 24, 1998

[54] OPTICAL DISK UNIT USING A SINGLE DEMODULATOR CIRCUIT FOR DEMODULATING TWO DISK PLAYERS

[75] Inventors: Akira Tsukihashi; Yutaka Kaneko, both of Ohra-gun; Takeshi Aoki, Ohta; Yoji Honda, Nitta-gun; Takashi Iwasaki, Isesaki, all of Japan

[73] Assignee: Sanyo Electric Co., Ltd., Osaka, Japan

[21] Appl. No.: 881,488

[22] Filed: Jun. 24, 1997

[30] Foreign Application Priority Data

Jul. 29, 1996 [JP] Japan ................................ 8-199285

[51] Int. Cl.⁶ .................................................. G11B 17/22
[52] U.S. Cl. ................................................. 369/33; 369/32
[58] Field of Search .................... 369/32, 33, 30, 369/34, 58, 15, 47, 48

[56] References Cited

U.S. PATENT DOCUMENTS

| | | | |
|---|---|---|---|
| 5,323,367 | 6/1994 | Tamura et al. | 369/32 |
| 5,365,502 | 11/1994 | Misono | 369/32 |
| 5,446,714 | 8/1995 | Yoshio et al. | 369/32 |

FOREIGN PATENT DOCUMENTS 9017158  1/1997  Japan.

*Primary Examiner*—Tan Dinh
*Attorney, Agent, or Firm*—Loeb & Loeb LLP

[57] ABSTRACT

First and second disc drives which respectively read first and second discs on which signals are digitally recorded perform multiprocessing of each disc's signals by a single demodulator circuit based on commands from a host device. In this way, the single demodulator circuit is shared by the first and the second disc drives, and each disc drive can be used in the same way as two independent disc drives.

22 Claims, 2 Drawing Sheets

OPTICAL DISK UNIT USING A SINGLE DEMODULATOR CIRCUIT FOR DEMODULATING TWO DISK PLAYERS

BACKGROUND OF THE INVENTION

1. Field of the Invention

The present invention relates to a disc unit comprising first and second disc drives which respectively perform reading of first and second discs on which signals are digitally recorded. More particularly, it relates to a disc unit configured to perform multiprocessing of digital signals from both discs.

2. Description of the Related Art

Opportunities to use personal computers have been increasing rapidly, since personal computers have spread not only in offices but also in homes.

Auxiliary storage devices such as a hard-disc drive, a CD-ROM drive, or other optical disc drives are often added to a personal computer. Recently, many users connect CD-ROM drives to their computers, since a variety of software has been provided in the form of CD-ROM discs.

A CD-ROM drive is configured so that it can play back CD-DA discs which are audio discs. Therefore, if a CD-ROM drive is idle, the drive is often used to play music while a user is operating a computer.

A variety of software is provided in the form of dictionaries, encyclopedias, and illustrated reference books. Therefore, it is often necessary to use a CD-ROM disc in order to look something up while another application is being run by a computer.

It is often necessary to add another CD-ROM drive if a user wishes to play music or refer to another CD-ROM dictionary and the like, while a computer is using playback data from the existing CD-ROM drive.

However, having two CD-ROM drives is expensive. It also needs respective connecting terminals for both the existing and the newly added CD-ROM drives. It may cause shortage of connecting terminals for auxiliary storage devices when other auxiliary storage devices have already been connected.

SUMMARY OF THE INVENTION

A disc drive related to the present invention is constituted so that a single demodulator circuit performs time division multiprocessing of data from each disc inserted in first and second disc drives. By sharing the single demodulator circuit, it is possible to use the first and second drives as two individual disc units.

When the discs inserted into the first and the second disc drives are judged to be ROM discs, a selecting circuit switches so that digital signals from the disc requested by a command from a host computer can be selected. Therefore, it becomes possible to use each disc drive equally without a predetermined priority. If the discs inserted into the first and second disc drives are judged to be a ROM disc and an audio disc, the selecting circuit switches so that digital signals from the audio disc are forcibly read when data which are demodulated digital signals of the audio disc and stored in a memory for storing data reaches a predetermined empty level. In this way, an audio disc can be played without interruption.

Using the constant angular velocity method, each disc drive controls rotation of a disc on which signals are recorded by the constant linear velocity method. Therefore, switching of the disc drives can be performed at a high speed when a disc drive is switched from one to the other.

Focus control by an optical pickup of a disc drive which is not selected by the selecting circuit is performed by a direct current component of a focus driving signal immediately before interruption of signal reading by the disc drive. Therefore, switching of the disc drives can be performed at a high speed when a disc drive is switched from one to the other.

The demodulated data from the demodulator circuit are stored in the memory separately, depending on whether the demodulated data are from the first disc drive or from the second disc drive. Therefore, managing of the demodulated data from each disc becomes easier, and interference between the demodulated data from both discs cam be avoided.

The first and second disc drives can be recognized by the host computer either as selectively independent auxiliary storage devices or a single auxiliary storage device. Therefore, if the host computer has only one port available as a connecting terminal for an auxiliary storage device, it is possible to use the first and second disc drives as two individual disc drives. If the host computer has two ports available as connecting terminals, the first and second disc drives can be used as two individual disc drives by using a widely-available device driver.

DESCRIPTION OF THE PREFERRED EMBODIMENTS

Figure 1:
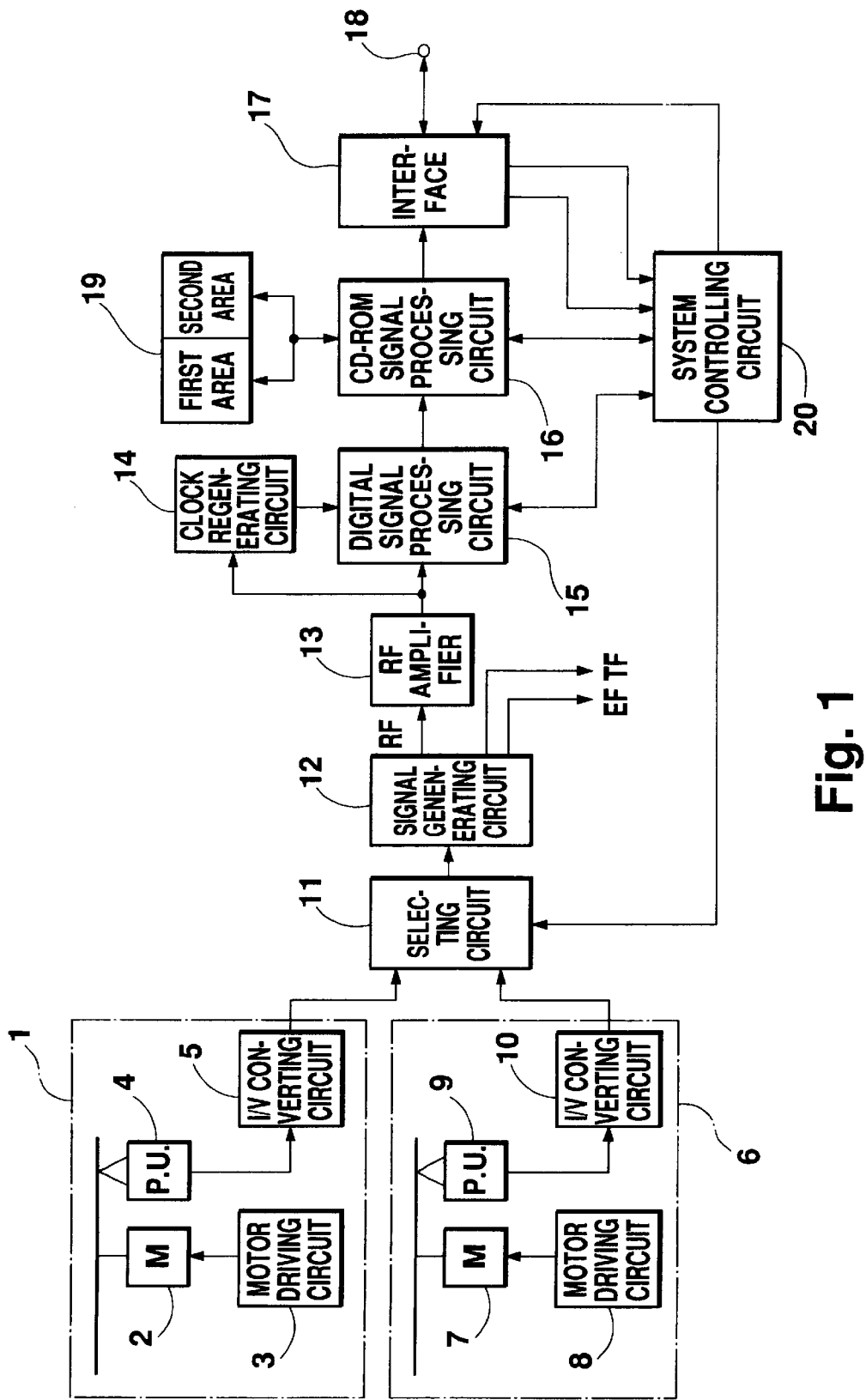
FIG. 1 is a circuit block diagram of a demodulator system for processing main signals of a CD-ROM drive related to an embodiment of the present invention.
Figure 2:
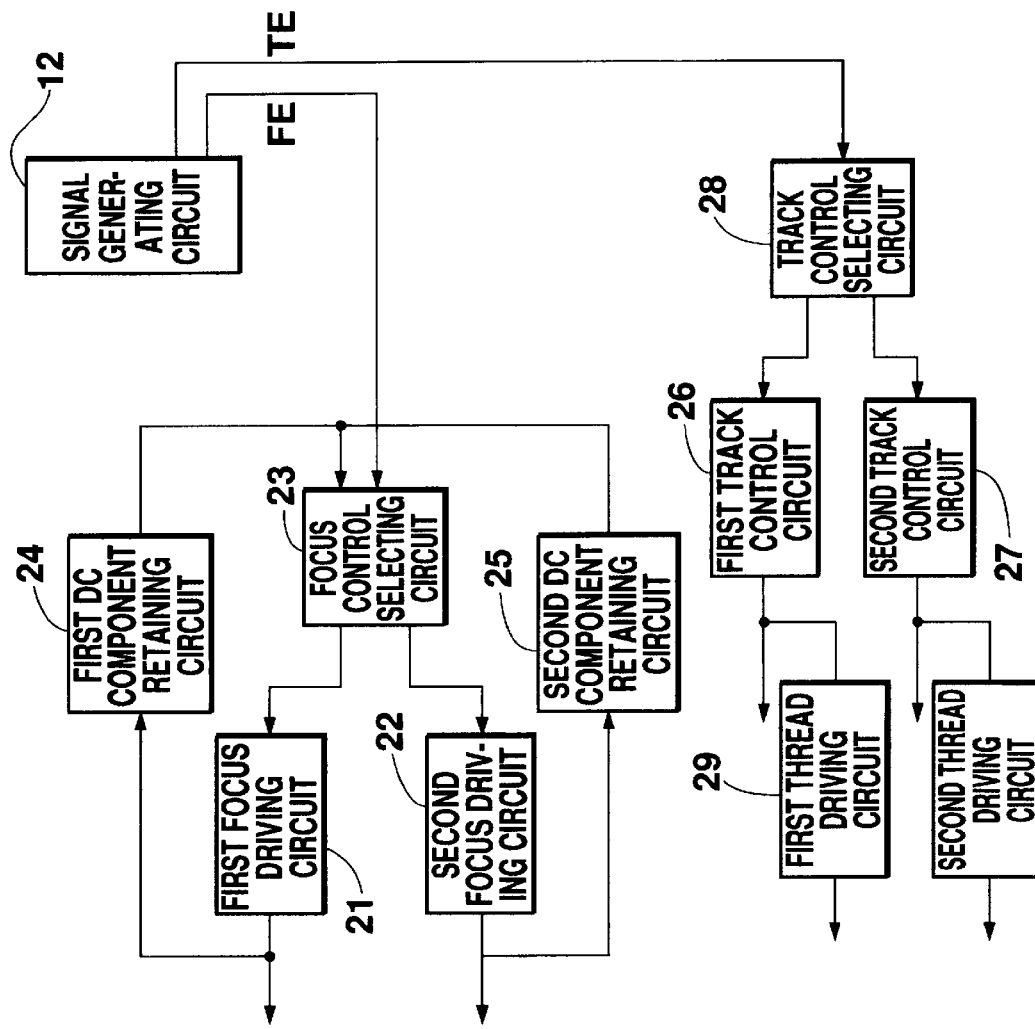
FIG. 2 is a circuit block diagram of a servo system of an optical pickup of a CD-ROM drive related to an embodiment of the present invention.

FIGS. 1 and 2 are circuit block diagrams of a CD-ROM drive related to an embodiment of the present invention. FIG. 1 shows a demodulator system for processing main signals, and FIG. 2 shows a servo system of an optical pickup to optically read signals recorded on a disc.

In FIG. 1, 1 denotes a first disc drive in which a CD format first disc is inserted. The first disc drive comprises:

a first spindle motor 2 for rotating the first disc;

a first motor driving circuit 3 for driving the first spindle motor;

an optical pickup 4 for emitting a reading laser beam to trace a disc and for reading digital signals recorded on the disc;

a first I/V converting amplifier 5 for converting current signals into voltage signals of received optical outputs from a photodetector of the first optical pickup 4 for obtaining signals of main data, focus control, and track control.

In FIG. 1, 6 denotes a second disc drive in which a CD format second disc is inserted. The second disc drive comprises:

a second spindle motor 7 for rotating the first disc;

a second motor driving circuit 8 for driving the second spindle motor;

an optical pickup 9 for emitting a reading laser beam to trace a disc and for reading digital signals recorded on the disc;

a second I/V converting amplifier 10 for converting current signals into voltage signals of optical outputs from a photodetector of the second optical pickup 9 for obtaining signals of main data, focus control, and track control.

The first and the second motor driving circuits 3 and 8 respectively drive the first and the second spindle motors 2 and 7 at a constant angular velocity so that a transfer rate of multiple demodulated data from the outermost tracks of each disc falls within a velocity range wherein signal processing for demodulating the recorded digital data can be carried out, and also faster than a rated velocity. In this case, each disc's angular velocity is not necessarily constant. However, the angular velocity of each disc is set so that the first and second disc drives 1 and 6 have equal performance.

Between voltage signals corresponding to optical outputs received from the first and the second optical pickups 4 and 9 and supplied to the first and the second I/V converting amplifiers 5 and 10, a selecting circuit 11 selects voltage signals from either the first I/V converting amplifier 5 or the second I/V converting amplifier 10. By performing calculation processing on the optical output voltage signals selected by the selecting circuit 11, a signal generating circuit 12 generates RF signals containing main data (high frequency signals), focus error signals for focus control, and tracking signals for track control. 13 is an RF signal amplifier for generating digital signals by amplifying the RF signals generated by the signal generating circuit 12 and by performing waveform shaping on the signal. 14 is a clock regenerating circuit regenerating bit clocks synchronized with the bits contained in the digital signals from the RF amplifier 13, and comprises a PLL circuit. 15 is a digital signal processing circuit for performing digital signal processing on the digital signals supplied from the RF amplifier 13 so that the signals can be demodulated in a format common with a CD-DA disc, using the bit clocks regenerated by the clock regenerating circuit 14 as operational clocks.

16 is a CD-ROM signal processing circuit for detecting synchronization by performing digital signal processing corresponding to CD-ROM disc signal format of the demodulated data from the digital signal processing circuit 15. The CD-ROM signal processing circuit 16 also performs error detection which is specific for demodulated data in CD-ROM disc signal format, and corrects the errors. 17 is an interface for machining with a host computer (not shown in FIG. 1) connected by a connecting terminal 18. 19 is a RAM used for digital signal processing by the CD-ROM signal processing circuit 16, and also used for storing CD-ROM data to be supplied to the host computer from the connecting terminal 18 through the interface 17. 20 is a system controlling circuit which performs a variety of control functions for the entire unit.

The system controlling circuit 20 controls switching of the selecting circuit 11 so that signals recorded on a disc requested by the computer can be selected based on a command from the computer through the interface 17.

The system controlling circuit 20 also manages reading/writing from and to the RAM 19. The RAM 19 is divided into two areas. A first area stores data corresponding to signals recorded on the disc inserted into the first disc drive 1, while a second area stores data corresponding to the signals recorded on a disc inserted into the second disc drive 6. Switching of the selecting circuit 11 selects the area to be used.

In FIG. 2, 21 is a first focus driving circuit for generating a focus driving signal to perform focus control by the first optical pickup 4. 22 is a second focus driving circuit for generating a focus driving signal to perform focus control by the second optical pickup 9. 23 is a focus control selecting circuit, and is switched by the system controlling circuit 20. The focus control selecting circuit 23 selectively supplies a focus error signal generated by the signal generating circuit 12 to either the first or the second focus driving circuit 21 or 22.

24 is a first direct current (DC) component retaining circuit for digitally detecting DC components of the focus driving signal generated by the first focus driving circuit 21, and also for retaining the DC component by storing it as data. 25 is a second direct-current (DC) component retaining circuit for digitally detecting DC components of the focus driving signal generated by the second focus driving circuit 22, and also for retaining the DC component by storing it as data.

The DC signals retained by the first and the second DC component retaining circuits 24 and 25 are supplied to the focus control selecting circuit 23. The focus control selecting circuit 23 selects the DC component from the optical pickup different from the optical pickup which the focus error signal is selecting.

26 is a first track driving circuit for generating a track driving signal to perform track control of the first optical pickup 4. 27 is a second track driving circuit for generating a track driving signal to perform track control of the second optical pickup 9. 28 is a track control selecting circuit for selectively supplying a track error signal generated by the signal generating circuit 12 to either the first or the second track driving circuit 26 or 27, under control of the system controlling circuit 20. 29 is a first thread driving circuit for driving the first optical pickup 4, based on a DC component of the track driving signal generated by the first track driving circuit 26. 30 is a second thread driving circuit for driving the second optical pickup 9, based on a DC component of the track driving signal generated by the first track driving circuit 27.

Actions of the signal processing system for performing main data demodulation will now be explained referring to the circuit block diagram in FIG. 1.

The optical output obtained by the first optical pickup 4 is supplied to the selecting circuit 11 as a voltage signal through the first I/V converting amplifier 5, while the optical output obtained by the second optical pickup 9 is supplied to the selecting circuit 11 as a voltage signal through the second I/V converting amplifier 10.

Under control of the system controlling circuit 20, the selecting circuit 11 switches so that only one of the optical outputs from the first or the second optical pickup 4 or 9 is selected. The optical outputs from the optical pickup selected by the selecting circuit 11 is supplied to the signal generating circuit 12.

The signal generating circuit 12 generates RF signals (i.e., main signals shown as RF in FIG. 1), a focus error signal (FE in FIG. 1), and a tracking error signal (TE in FIG. 1) by processing the optical outputs from the selected optical pickup. Therefore, the above signals (RF, FE, and TE) correspond to a playback mechanism by a disc drive comprising the optical pickup which generates optical outputs selected by the selecting circuit 11.

The RF signals generated by the signal generating circuit 12 are amplified by the RF amplifier 13. After the RF signals are waveform-shaped into digital signals, they are supplied to the digital signal processing circuit 15. The digital signal processing circuit 15 demodulates the signals into a format common with CD-DA disc signals. In the digital signal processing circuit 15, digital signals are all demodulated in synchronism with the bit clocks regenerated by the clock regenerating circuit 14. The demodulation is performed depending on a data transfer rate following changes in disc driving velocity relative to the linear velocity of the signals recorded on the disc.

The CD-ROM data demodulated by the digital signal processing circuit 15 are further demodulated by the CD-ROM signal processing circuit 16 using digital signal processing corresponding to the CD-ROM data. The CD-ROM signal processing circuit 16 also performs synchronization detection and detection/correction of errors specific to CD-ROM data.

The CD-ROM data demodulated by the CD-ROM signal processing circuit 16 are supplied to the computer from the connecting terminal 18 via the interface 17, based on a command from the computer connected by the connecting terminal 18.

The RAM 19 is divided into the first and the second areas. The system controlling circuit 20 controls the memory area in which the CD-ROM data are stored, depending on the disc drive in which a disc being read is inserted. When the signals read from the disc inserted in the first disc drive 1 are selected by the selecting circuit 11, the obtained CD-ROM data are stored in the first area of the RAM 19. When the signals read from the disc inserted in the second disc drive 6 are selected by the selecting circuit 11, the obtained CD-ROM data are stored in the second area of the RAM 19. Therefore, it is possible to independently manage the CD-ROM data corresponding to the discs inserted into the first and second disc drives 1 and 6. In this way, data management becomes easier and interference of data between different discs is avoided.

The CD-ROM signal processing circuit 16 stores audio data from a CD-DA disc in one of the areas in the RAM 19. The CD-ROM signal processing circuit 16 also reads the data from the RAM 19 and supplies the data to the computer through the interface 17. The CD-ROM signal processing circuit 16 also judges whether incoming data are CD-ROM data or audio data. The judgment result is supplied to the system controlling circuit 20. The system controlling circuit 20 notifies the computer of this judgment as required.

Each disc inserted in the first or the second disc drive 1 or 6 is played back at a high speed with a predetermined constant rotation by driving each spindle motor 2 or 7 at a constant angular velocity using the motor driving circuit 3 or 8. In this case, the driving velocity of each disc is set so that the transfer rate of the demodulated data corresponding to the digitally recorded signals scanned from the outermost track of a disc having a minimum linear velocity (1.2 m/s) standardized to the signal format of CD-DA discs essentially attains a maximum speed within the signal processing operable range that has been set with an appropriate allowance reduced from the maximum speed limit of the signal processing operable range in the signal processing system.

For example, if the essential speed limit that is set in this manner is a data transfer rate equivalent to 20 times the rated linear velocity of the standardized signal format of CD-DA discs, by the motor driving circuits 3 and 8 of each disc drive are set so that the disc is driven at a constant angular velocity with a rotating speed equivalent to 20 times the aforementioned rated velocity at the outermost track on a standard minimum linear velocity disc.

Actions by the servo system of the optical pickup will now be explained using the circuit block diagram in FIG. 2.

A focus error signal generated by the signal generating circuit 12 is supplied to the focus control selecting circuit 23.

The focus control selecting circuit 23 is switched under control of the system controlling circuit 20. Depending on the disc drive into which the disc being read is inserted, the focus error signal from the signal generating circuit 12 is supplied to either the first focus driving circuit 21 or the second focus driving circuit 22. Therefore, focus control of the optical pickup of a disc drive into which the disc being read is inserted is performed.

The DC component of the focus driving signal generated by the first focus driving circuit 21 is retained by the first DC component retaining circuit 24, while the DC component of the focus driving signal generated by the second focus driving circuit 22 is retained by the second DC component retaining circuit 25. The focus control selecting circuit 23 selects one of the first focus driving circuit 21 and second focus driving circuit 22 to which the focus error signal from the signal generating circuit 12 is supplied. Furthermore, the focus control circuit selects the other of the first focus driving circuit 21 and second focus driving circuit 22 to which the DC component from the first or the second DC component retaining circuit 24 or 25 is supplied. The DC component immediately before interruption of focus driving by the focus driving circuit 21 or 22 is supplied again to the focus driving circuit 21 or 22. Therefore, in the disc drive into which the disc being read is not inserted, the focus control state of the optical pickup is maintained using the DC component by which focus control immediately before interruption was performed. In this way, focus control of a disc to be read is resumed instantaneously upon switching of disc drives.

The tracking error signal generated by the signal generating circuit 12 is supplied to the track control selecting circuit 28.

The track control selecting circuit 28 is switched under control of the system controlling circuit 20. Depending on the disc drive into which the disc being read is inserted, the tracking error signal from the signal generating circuit 12 is supplied to either the first or the second track driving circuit 26 or 27. Therefore, track control by the optical pickup of the disc drive in which the disc being read is inserted is performed.

The track driving signal generated by the first track driving circuit 26 is supplied to the first thread driving circuit 29, while the track driving signal generated by the second track driving circuit 27 is supplied to the second thread driving circuit 30. Therefore, thread driving is performed by the optical pickup of the disc drive into which the disc being read is inserted.

Track control by the optical pickup of the disc drive which is not operating is performed by halting the track servo upon interruption of playback.

Detailed actions will now be explained with concrete examples.

As a first example, a case of a CD-ROM disc and a CD-DA disc to be respectively played by the first and second disc drives will be explained. A user is operating a personal computer using CD-ROM data while playing music of the CD-DA disc. Signals read from both the CD-ROM disc and the CD-DA disc are supplied to circuits corresponding to each disc after the system controlling circuit 20 switches the selecting circuit 11, and demodulation is performed in a multiprocessor manner.

When discs are inserted into both the first and second disc drives, disc types are judged by identification codes recorded on the discs. The system controlling circuit 20 switches the selecting circuit 11 depending on a combination of disc types recognized.

If the combination of discs to be read by the disc drives is a CD-ROM and a CD-DA, the selecting circuit 11 is basically switched so that signals read from the CD-ROM disc are selected upon a request for CD-ROM data from a host computer. During the time the ROM data are not requested, the selecting circuit is switched so that the signals read from the CD-DA disc are selected. Therefore, ROM data are supplied to the computer depending on a command to request ROM data. The audio data of the CD-DA disc are demodulated during times between commands to request ROM data, and the audio data are sequentially stored in one of the areas of the RAM 19.

Since data reading from the CD-ROM disc or the CD-DA disc is performed at a velocity higher than the rated velocity, the requested ROM data can be demodulated at a high speed. Thus, time needed for data reading from the CD-DA disc is saved, and an average data transfer rate sufficient to demodulate the audio data while ROM data are not requested is also saved.

The switching control of the selecting circuit 11 is related to the amount of audio data stored in one of the areas in the RAM 19.

If a small amount of audio data at an empty level are stored in the RAM 19, the selecting circuit 11 is forcibly switched so that signals read from the CD-DA disc are selected.

In this case, reading the CD-DA disc has priority. Therefore, if the computer requests ROM data, the request stands by until the data stored in one of the areas of the RAM 19 goes below the empty level. Music playback from the CD-DA disc is prevented from being interrupted by the audio data stored in the RAM 19 becoming empty.

On the other hand, if the audio data being stored in the RAM 19 overflows, the signals corresponding to the portion that has overflowed and is thus not stored in the RAM 19 are accessed and read again. Therefore, continuity of audio data stored in the RAM 19 is secured. During the access period at which the pickup is moving and reading signals is not performed, the selecting circuit 11 is switched so that signals from the CD-ROM disc can be selected. In this way, CD-ROM data are ready to be supplied upon a command from the computer.

In the disc drive from which the selecting circuit 11 does not select signal reading, the track servo of the optical pickup is halted. However, the optical pickup is kept at its position before reading interruption. The focus control of the optical pickup is performed by the DC component of the focus driving signal immediately before the reading interruption. Therefore, the optical pickup of the disc drive whereby signal reading is resumed is promptly switched.

The discs being inserted in the first and the second disc drives 1 and 6 are driven at a constant angular velocity. Therefore, if the position of signal reading by the optical pickup is moved radially and signal reading is performed again at the moved position, it is not necessary to change the disc driving velocity depending on the signal reading position. Therefore, the disc drive which resumes signal reading is promptly switched to a state for signal reading.

Therefore, time loss due to switching disc drives is kept to a minimum.

A combination of a CD-ROM disc and a CD-ROM disc to be read by each disc drive will be explained next.

If the combination of discs to be played by each drive is judged to be a CD-ROM and a CD-ROM by the identification codes recorded on each disc to be inserted in the first and the second disc drives 1 and 6, the system controlling circuit 20 switches the selecting circuit 11 so that signals read from the CD-ROM disc requested by a command from the computer can be selected.

In this way, if the combination of the discs to be read is a CD-ROM and a CD-ROM, signals read from the CD-ROM requested by the computer using the command are demodulated in a multiprocessor manner by switching the selecting circuit 11 under control of the system controlling circuit 20.

A method of connecting the disc unit of the present invention with a host computer will now be explained below.

The interface 17 has a function to switch between the multiple ID state and a single ID state so that a connecting state of the disc unit can be selected. This selection is recognized by the system controlling circuit 20. Switching between multiple IDs and a single ID is performed by a switch such as a dip switch operable from outside.

If the host computer has only one port available as a connecting terminal for an auxiliary storage device and only a single ID is assigned to the device, the interface 17 should be switched to the single ID state.

In this way, the disc unit is recognized as a single auxiliary storage device, although it is possible to use the disc unit of the present invention as two independent disc drives.

However, it is necessary for a command from the host computer to include selecting data for indicating which disc's data are requested. Such a command including the selecting data should be generated by a device driver.

On the other hand, if the host computer has more than two ports available for connecting terminals for auxiliary storage devices and two IDs can be assigned to the disc unit of the present invention, the interface should be switched to the multiple ID state.

The first and the second disc drives 1 and 6 are recognized as two independent auxiliary storage devices by being assigned to different IDs. Therefore, it is possible to use the disc unit of the present invention as two independent disc drives.

In this case, it is not necessary for the command to include the disc selecting data, and a widely-available device driver can be used.

If an IDE interface is taken as an example, a multiple ID state means that the interface 17 is switched so that the first and the second disc drives 1 and 6 are respectively assigned to a master and a slave of the IDE port.

The interface 17 has a function to judge whether data of a disc inserted into the first or the second disc drive is requested by the command. The interface 17 has separate control signal routes to the system controlling circuit 20, depending on whether the command requests data from the first or the second disc drive.

Therefore, the system controlling circuit 20 judges whether the command is requesting the data from the first disc drive 1 or the second disc drive 6, based on the terminal the controlling signal is coming from. Therefore, the system controlling circuit 20 performs, without referring to contents of the interface 17, switching of the selecting circuit 11 or system control corresponding to commands such as to indicate which area of the RAM 19 stores the data. Therefore, responses of the system controlling circuit 20 corresponding to commands will become faster.

While there has been described what are at present considered to be preferred embodiments of the invention, it will be understood that various modifications can be made thereto, and it is intended that the appended claims cover all such modifications as fall within the true spirit and scope of the invention.

What is claimed is:

1. A disc unit to read and play back signals digitally recorded on first and second discs, the disc unit comprising:

first and second disc drives for respectively reading first and second signals digitally recorded on the first and the second discs and outputting first and second read signals;

a selecting circuit connected to the first and second disc drives for switchably selecting one of the first and the second read signals from the first or the second disc drive;

a demodulator circuit for demodulating the first and the second read signals and for obtaining first and second demodulated data;

a memory for storing the first and the second demodulated data obtained by the demodulator circuit; and a controlling circuit for controlling the selecting circuit in response to disc types being read from the first and second disc drives and in response to the amount of the first and the second demodulated data stored in the memory, the controlling circuit further controlling which of the first and the second demodulated data should be read from the memory depending on a command supplied from an external source.

2. The disc unit as claimed in claim 1, further comprising an interface for connecting with an external host device, the command being supplied by the external host device through the interface.

3. The disc unit as claimed in claim 2 wherein the interface switches between a multiple ID state, in which the disc unit is recognized by the host device using multiple IDs, and a single ID state, in which the disc unit is recognized by the host device using a single ID.

4. The disc unit as claimed in claim 3 wherein, in the case of the interface being set to the single ID state, the controlling circuit controls which of the demodulated data from the first and the second discs should be read, depending on selecting data included in the command sent from the host device.

5. The disc unit as claimed in claim 3, wherein, in the case of the interface being set to the multiple ID state, the controlling circuit controls which of the demodulated data from the first and the second discs should be read, depending on selecting data included in the command sent from the host device.

6. A disc unit to read and play signals digitally recorded on first and second discs, the disc unit comprising:

first and second disc drives for respectively reading first and second signals digitally recorded on the first and second discs and outputting first and second read signals;

a selecting circuit for switchably selecting one of the first and the second read signals from the first or the second disc drive;

a demodulator circuit for demodulating in a time-divided manner the first and the second read signals selected by the selecting circuit and for obtaining first or second demodulated signals; and a memory for storing the first or the second demodulated signals obtained by the demodulator circuit.

7. The disc unit as claimed in claim 6 wherein the first and second disc drives read digitally recorded signals at a velocity faster than a rated velocity.

8. The disc unit as claimed in claim 7 wherein the first and second disc drives read digitally recorded signals at a high speed by driving a disc, on which signals are recorded by a constant linear velocity, at a constant angular velocity.

9. The disc unit as claimed in claim 7, wherein the disc drive comprises:

an optical pickup for reading a disc;

a focus driving circuit for focusing the optical pickup;

a direct current component retaining circuit for retaining a direct current component data related to focusing by the focus driving circuit immediately before reading interruption by the disc drive not being selected by the selecting circuit; and a focus control selecting circuit for controlling focus by the focus driving circuit based on the direct current component retained by the direct current retaining circuit when the selecting circuit again selects the disc drive from which reading has been halted and the disc drive resumes reading of the digitally recorded data.

10. The disc unit as claimed in claim 7 wherein the selecting circuit selects the signals read by the disc drive requested by the command from the external source, when the discs to be read by the first and the second disc drives are both CD-ROMS.

11. A disc unit to read and play signals digitally recorded on first and second discs, the disc unit comprising:

first and second disc drives for respectively reading first and second signals digitally recorded on first and second discs and outputting first and second read signals;

a selecting circuit for selecting one of the first and the second read signals from the first or the second disc drive;

a demodulator circuit for demodulating the read signals selected by the selecting circuit and for obtaining first or second demodulated signals; and a memory for separately storing the first or the second demodulated signals obtained by the demodulator circuit, wherein the first and second disc drives read digitally recorded signals at a velocity faster than a rated velocity and wherein in the case of the discs to be played by the first and the second disc drives being a CD-ROM and an audio disc, when the data demodulated from the digitally recorded signals on the audio disc and are stored in one area in the memory overflows the area, the disc drive again reads digitally recorded signals on the audio disc corresponding to demodulated data not stored in the memory due to the overflow.

12. The disc unit as claimed in claim 11, wherein when the data demodulated from the digitally recorded signals on the audio disc reach a predetermined empty level in the memory, the selecting circuit forcibly switches so that reading the audio disc is performed.

13. The disc unit of claim 1, wherein when the discs being played by the first and the second disc drives are a CD-ROM and an audio disc and the demodulated data from the digitally recorded signals on the audio disc and are stored in a first area in the memory overflows the first area, the disc drive again reads digitally recorded signals on the audio disc corresponding to demodulated data not stored in the memory due to the overflow.

14. The disc unit of claim 13, wherein when the data demodulated from the digitally recorded signals on the audio disc reach a predetermined empty level in the memory, the selecting circuit forcibly switches so that reading of the audio disc is performed.

15. The disc unit of claim 6, wherein when the discs being played by the first and the second disc drives are a CD-ROM and an audio disc and the demodulated data from the digitally recorded signals on the audio disc and are stored in a first area in the memory overflows the first area, the disc drive again reads digitally recorded signals on the audio disc corresponding to demodulated data not stored in the memory due to the overflow.

16. The disc unit of claim 15, wherein when the data demodulated from the digitally recorded signals on the audio disc reach a predetermined empty level in the memory, the selecting circuit forcibly switches so that reading of the audio disc is performed.

17. The disc unit of claim 1, wherein the first and second disc drives read digitally recorded signals at a velocity faster than a rated velocity.

18. The disc unit of claim 17 wherein the first and second disc drives read digitally recorded signals at a high speed by driving a disc, on which signals are recorded by a constant linear velocity, at a constant angular velocity.

19. The disc unit of claim 1, wherein the first disc drive plays a first disc type and the second disc drive plays a second disc type, the demodulation of the first disc type has a higher priority than the second disc type.

20. The disc unit of claim 19, wherein the demodulation of the second disc type is performed in response to the command supplied from the external source, while the demodulation of the first disc type is performed when the first disc type is not being demodulated.

21. The disc unit of claim 6, wherein the first disc drive plays a first disc type and the second disc drive plays a second disc type, the demodulation of the first disc type has a higher priority than the second disc type.

22. The disc unit of claim 21, wherein the demodulation of the second disc type is performed in response to a command supplied from a control device, while the demodulation of the first disc type is performed when the first disc type is not being demodulated.

* * * * *